(12) United States Patent
Tsuboi et al.

(10) Patent No.: US 11,618,040 B2
(45) Date of Patent: Apr. 4, 2023

(54) AIR CLEANER

(71) Applicant: CREATIVE TECHNOLOGY CORPORATION, Kawasaki (JP)

(72) Inventors: Kazuki Tsuboi, Kawasaki (JP); Shinsuke Hirano, Kawasaki (JP); Yoshiaki Tatsumi, Kawasaki (JP); Li Luo, Kawasaki (JP)

(73) Assignee: CREATIVE TECHNOLOGY CORPORATION, Kawasaki (JP)

( * ) Notice: Subject to any disclaimer, the term of this patent is extended or adjusted under 35 U.S.C. 154(b) by 225 days.

(21) Appl. No.: 16/771,420

(22) PCT Filed: Dec. 13, 2018

(86) PCT No.: PCT/JP2018/045987
§ 371 (c)(1),
(2) Date: Jun. 10, 2020

(87) PCT Pub. No.: WO2019/131190
PCT Pub. Date: Jul. 4, 2019

(65) Prior Publication Data
US 2021/0107013 A1 Apr. 15, 2021

(30) Foreign Application Priority Data
Dec. 29, 2017 (JP) .............................. JP2017-255199

(51) Int. Cl.
*B03C 3/32* (2006.01)
*B03C 3/36* (2006.01)
(Continued)

(52) U.S. Cl.
CPC ................ *B03C 3/32* (2013.01); *B03C 3/368* (2013.01); *B03C 3/41* (2013.01); *B03C 3/49* (2013.01);
(Continued)

(58) Field of Classification Search
IPC .................. B03C 3/32,3/368, 3/41, 3/49, 3/64, 2201/06, 2201/30, 2201/10; B64C
(Continued)

(56) References Cited

U.S. PATENT DOCUMENTS 8,920,537 B2 * 12/2014 Seike ...................... B03C 3/017
96/417
10,737,277 B2 * 8/2020 Luo ........................... B03C 3/15
(Continued)

FOREIGN PATENT DOCUMENTS

CN 102728470 A 10/2012
CN 203075663 U 7/2013
(Continued)

OTHER PUBLICATIONS

PCT/ISA/210, "International Search Report for International Application No. PCT/JP2018/045987," dated Mar. 5, 2019.
(Continued)

*Primary Examiner* — Christopher P Jones
*Assistant Examiner* — Sonji Turner
(74) *Attorney, Agent, or Firm* — Manabu Kanesaka

(57) ABSTRACT

Provided is an air cleaner that can take a large amount of air in a large space into a dust collector with good efficiency while being lightweight and having easy maintenance. An air cleaner is provided with a drone and a dust collector. The drone has a main body unit and propellers attached to the tips of frames. The dust collector has electric discharge electrodes and a dust collection electrode. The electric discharge electrodes are connected to a booster unit within a central chamber. The booster unit is electrically connected to a control unit in the main body unit. Electric discharge is formed between the dust collection electrode and the electric discharge electrodes, and dust particles in the air are charged and collected by the dust collection electrode.

7 Claims, 18 Drawing Sheets

(51) Int. Cl.
  *B03C 3/49* (2006.01)
  *B03C 3/64* (2006.01)
  *B03C 3/41* (2006.01)
  *B64C 39/02* (2006.01)
  *F24F 7/04* (2006.01)
  *F24F 7/003* (2021.01)

(52) U.S. Cl.
  CPC ............. *B03C 3/64* (2013.01); *B64C 39/024* (2013.01); *F24F 7/003* (2021.01); *F24F 7/04* (2013.01); *B03C 2201/30* (2013.01); *B64C 2201/027* (2013.01); *B64C 2201/108* (2013.01); *B64C 2201/12* (2013.01); *B64C 2201/14* (2013.01)

(58) Field of Classification Search
  IPC .............................. 2201/30, 2201/10, 2201/024, 2201/027, 2201/108, 2201/12, 2201/14, 2201/20, 39/024, 39/02; B64D 1/00; F24F 8/194, 8/30
  See application file for complete search history.

(56) References Cited

U.S. PATENT DOCUMENTS

| | | | | |
|---|---|---|---|---|
| 2012/0255439 | A1* | 10/2012 | Seike | ..................... B03C 3/017 95/79 |
| 2019/0076852 | A1 | 3/2019 | Luo et al. | |
| 2021/0039032 | A1* | 2/2021 | Kweon | ................. B64C 39/024 |

FOREIGN PATENT DOCUMENTS

| | | | |
|---|---|---|---|
| CN | 103379963 | A | 10/2013 |
| CN | 104354856 | A | 2/2015 |
| CN | 104964356 | A | 10/2015 |
| CN | 105157119 | A | 12/2015 |
| CN | 205606837 | U | 9/2016 |
| CN | 106828934 | A | 6/2017 |
| CN | 107404068 | A | 11/2017 |
| CN | 206734613 | U | 12/2017 |
| JP | S48-48274 | U | 10/1971 |
| JP | S49-81277 | U | 10/1972 |
| JP | S48-109567 | U | 12/1973 |
| JP | H05-146713 | A | 6/1993 |
| JP | H08-112553 | A | 5/1996 |
| JP | H08-131883 | A | 5/1996 |
| JP | H09-308837 | A | 12/1997 |
| JP | 2014-515086 | A | 6/2014 |
| KR | 1020170076988 | A | 7/2017 |
| WO | 2017/043599 | A1 | 3/2017 |

OTHER PUBLICATIONS

Europe Patent Office, "Search Report for European Patent Application No. 18894915.0," dated Nov. 19, 2020.
China National Intellectual Property Administration, "Office Action and Search Report for Chinese Patent Application 201880084389.9," dated Nov. 2, 2021.
Japan Patent Office, "Office Action for Japanese Patent Application No. 2019-562982," dated Aug. 3, 2022.
Korean Intellectual Property Office, "Office Action for Korean Patent Application No. 10-2020-7016101," dated Nov. 8, 2022.

* cited by examiner

| Dust collector | Hight L (cm) | Diameter R (cm) | Electrode Area (m²) | Cross section of wind passage (m²) | Volume of air passing through Dust collector (m²/s) |
|---|---|---|---|---|---|
| 100-1 | 1.25 | 10 | 0.0039 | 0.0079 | 0.0118 |
| 100-2 | 2.5 | 10 | 0.0079 | 0.0079 | 0.0118 |
| 100-3 | 5 | 10 | 0.0157 | 0.0079 | 0.0118 |
| 100-4 | 2.5 | 20 | 0.0157 | 0.0014 | 0.0471 |
| 100-5 | 5 | 20 | 0.0314 | 0.0014 | 0.0471 |
| 100-6 | 10 | 20 | 0.0628 | 0.0014 | 0.0471 |
| 100-7 | 2.5 | 5 | 0.0039 | 0.0020 | 0.0029 |
| 100-8 | 5 | 5 | 0.0079 | 0.0020 | 0.0029 |
| 100-9 | 10 | 10 | 0.0314 | 0.0079 | 0.0118 |
| 100-10 | 1.25 | 5 | 0.0020 | 0.0020 | 0.0029 |

Fig.17

| Dust collector | Attenuation rate (1/min) | Natural attenuation (1/min) | CADR (m³/min) | Dust collection rate (CDRA/Q) (%) |
|---|---|---|---|---|
| 100-1 | 0.066 | 0.018 | 0.131 | 18 |
| 100-2 | 0.048 | 0.018 | 0.082 | 12 |
| 100-3 | 0.109 | 0.018 | 0.249 | 35 |
| 100-4 | 0.092 | 0.018 | 0.202 | 7 |
| 100-5 | 0.120 | 0.018 | 0.281 | 10 |
| 100-6 | 0.131 | 0.018 | 0.310 | 11 |
| 100-7 | 0.056 | 0.018 | 0.105 | 59 |
| 100-8 | 0.058 | 0.018 | 0.110 | 62 |
| 100-9 | 0.119 | 0.018 | 0.279 | 39 |
| 100-10 | 0.054 | 0.018 | 0.099 | 56 |

Fig.18

| Dust collector | Wind speed setteing | Negative ion concentration ×10³/CC | | |
|---|---|---|---|---|
| | | Average | Dispersion | Standard deviation |
| 100-7 | A | 0.1 | 0.0 | 0.2 |
| | B | 0.0 | 0.0 | 0.0 |
| | C | 0.0 | 0.0 | 0.0 |
| | D | 0.0 | 0.0 | 0.0 |
| 100-2 | A | 445.0 | 3449.1 | 58.7 |
| | B | 314.0 | 221.0 | 14.9 |
| | C | 233.4 | 719.3 | 26.8 |
| | D | 129.9 | 12808.4 | 113.2 |
| 100-8 | A | 49.3 | 4855.1 | 69.7 |
| | B | 0.0 | 0.0 | 0.0 |
| | C | 0.0 | 0.0 | 0.0 |
| | D | 0.0 | 0.0 | 0.0 |
| 100-3 | A | 208.2 | 1458.0 | 38.2 |
| | B | 53.1 | 1223.1 | 35.0 |
| | C | 0.2 | 0.1 | 0.2 |
| | D | 0.0 | 0.0 | 0.0 |
| 100-5 | A | 431.3 | 1453.5 | 38.1 |
| | B | 316.0 | 308.9 | 17.6 |
| | C | 276.4 | 22.0 | 4.7 |
| | D | 197.3 | 7687.9 | 87.7 |
| 100-9 | A | 0.0 | 0.0 | 0.0 |
| | B | 0.0 | 0.0 | 0.0 |
| | C | 0.0 | 0.0 | 0.0 |
| | D | 0.0 | 0.0 | 0.0 |
| 100-6 | A | 225.2 | 4195.3 | 64.8 |
| | B | 100.4 | 1867.8 | 43.2 |
| | C | 29.2 | 853.7 | 29.2 |
| | D | 2.5 | 2.5 | 1.6 |
| 100-10 | A | 0.0 | 0.0 | 0.0 |
| | B | 0.0 | 0.0 | 0.0 |
| | C | 0.0 | 0.0 | 0.0 |
| | D | 0.0 | 0.0 | 0.0 |
| 100-1 | A | 420.4 | 564.5 | 23.8 |
| | B | 277.7 | 2933.8 | 54.2 |
| | C | 138.8 | 16913.3 | 130.1 |
| | D | 86.8 | 15068.5 | 122.8 |
| 100-4 | A | 472.9 | 44.2 | 6.6 |
| | B | 351.3 | 343.2 | 18.5 |
| | C | 296.1 | 292.8 | 17.1 |
| | D | 229.8 | 348.5 | 18.7 |

Fig.20

| Dust collector | Attenuation rate (1/min) | CADR (m³/min) |
|---|---|---|
| 10-1 | 0.1045 | 0.2344 |
| 10-3 | 0.1015 | 0.2181 |

AIR CLEANER

RELATED APPLICATIONS

The present application is National Phase of International Application No. PCT/JP2018/045987 filed Dec. 13, 2018, and claims priority from Japanese Application No. 2017-255199, filed Dec. 29, 2017, the disclosure of which is hereby incorporated by reference herein in its entirety.

TECHNICAL FIELD

The present invention relates o an air cleaner that floats in the air and can collect dust in the air.

BACKGROUND ART

As an air cleaner of this kind, there have conventionally been technologies as described in, for example, Patent Literatures 1 and 2.

An air cleaner described in Patent Literature 1 includes a dust collecting body to attract dust in the air, flying means that causes the dust collecting body to float in the air using a propeller, and a control device that controls the flying means.

With this configuration, when the flying means is driven to cause the air cleaner to float in a room, the floating air cleaner attracts dust floating in the air by a fixed electronic nonwoven fabric on a surface of the dust collecting body. In addition, dust attached to top surfaces of furniture and shelves placed in the room is lifted into the air by the propeller and attracted to the fixed electronic nonwoven fabric.

On the other hand, an air cleaner described in Patent Literature 2 includes a flying body composed of a propeller-driven balloon and a dust collector attached to the flying body. The dust collector is formed of a container having an intake port and an exhaust port that can be electrically charged to have mutually opposite polarities.

With this configuration, when the flying body is moved in the air by propulsion of a propeller, air flows into the dust collector through the intake port. Accordingly, electrically charged dust in the air is collected near and inside the intake port and near the exhaust port of the dust collector.

CITATION LIST

Patent Literature

PLT 1: Japanese Application Laid-Open No. H08-131883
PLT 2: Published Japanese Translations of PCT International Publication for Patent Application No. 2014-515086

SUMMARY OF THE INVENTION

Technical Problem

However, the conventional air cleaners described above suffer from the following problems.

The air cleaners described in Patent Literatures 1 and 2 are both structured to collect dust through contact with the dust collector while moving the flying body by propulsion of the propeller. The dust collection rate per unit time therefore depends on the speed and the path of the flying body. This means that when the speed of the flying body is slow and the flying body does not move around easily, the dust collection rate decreases. That is, these air cleaners have limited dust collecting capability.

Particularly, in such a structure as that of the air cleaner described in Patent Literature 2 in which the intake port and the exhaust port of the dust collector have their respective different electric charges, if the structure requires application of a high voltage to electrically charge dust, it is necessary to space electrodes of the intake port and the exhaust port from each other so that the intake port and the exhaust port are separated from each other for insulation therebetween.

When the thus structured dust collector is mounted at a position having an influence on the air flow by a propulsion mechanism of the flying body, it significantly affects propulsion of the flying body. In addition, since the dust collector becomes large in size, the center of gravity of the entire air cleaner moves depending on the mounting position of the dust collector. This makes control of the flying body very difficult.

The present invention has been made to solve the above-described problems, and an object thereof is to provide a lightweight and easily maintainable air cleaner that is capable of taking a wider range of and a larger volume of air efficiently into a dust collector.

Solution to the Problems

In order to solve the above-described problems, the invention of claim 1 is an air cleaner comprising a drone that a plurality of propellers that take in air from above and exhaust air below are disposed around a main body unit having a control unit that controls flying operations, and floats by propulsion of the plurality of propellers; and a dust collector having a cylindrical dust collection electrode opened upward and downward and an electric discharge electrode disposed in an approximately central site of the dust collection electrode for application of a high voltage between the dust collection electrode and the electric discharge electrode such that electric discharge occurs at a tip end portion of the electric discharge electrode to electrically charge and collect dust particles in the air that have flowed into the dust collection electrode, in which the dust collector is assembled to the drone such that the electric discharge electrode is positioned at approximately the center above the drone, and the position where the dust collection electrode is arranged in the dust collector is set such that the central position in the height direction of the dust collection electrode is equal to or higher than the position of the rotational plane of the propellers and the lower end position of the dust collection electrode is equal to or lower than the position of an upper vicinity of the rotational plane of the propellers, so that air can be taken into the dust collection electrode by rotational forces of the propellers.

With this configuration, the control unit can control the plurality of propellers to cause the drone to float. When the drone is in such a floating state and the dust collector is activated to apply a high voltage between the dust collection electrode and the electric discharge electrode, electric discharge occurs at a tip end portion of the electric discharge electrode and thereby air ions are generated in the vicinity of the electric discharge electrode. Air ions with the same polarity as the electric discharge electrode are then attracted toward the dust collection electrode and, during the movement of the air ions to the dust collection electrode, dust particles in the air that have flowed into the dust collection electrode are electrically charged to have the same polarity.

The thus electrically charged dust particles are attracted toward and collected by the dust collection electrode.

That is, with the air cleaner according to the present invention, air ions can move across the wide space between the electric discharge electrode and the dust collection electrode to electrically charge a large amount of dust particles that have flowed into the wide space and thereby collect a large amount of the thus electrically charged dust particles.

Incidentally, air taken in from above by the propellers of the drone has a speed much slower than that of air exhausted below. This allows a larger amount of dust particles to be collected by ionizing air that the propellers take in from above than by ionizing air exhausted below.

In view of the consideration above, in the air cleaner according to the present invention, the dust collector is assembled to the main body unit of the drone such that the electric discharge electrode is positioned at approximately the center above the drone and in addition, the central position in the height direction of the dust collection electrode is equal to or higher than the position of the rotational plane of the propellers. This allows air on the air intake side that has flowed into the dust collection electrode in the dust collector to be mainly ionized.

However, if the height position of the dust collector is too high with respect to the propellers, air cannot be taken sufficiently into the dust collection electrode.

To address this, in the air cleaner according to the present invention, the lower end position of the dust collection electrode is set equal to or lower than the position of an upper vicinity of the rotational plane of the propellers, so that a desired volume of air can be taken into the dust collection electrode.

The invention of claim 2 is an air cleaner comprising a drone that a plurality of propellers that take in air from above and exhaust air below are disposed around a main body unit having a control unit that controls flying operations, and floats by propulsion of the plurality of propellers; and a dust collector having a cylindrical dust collection electrode opened upward and downward and an electric discharge electrode disposed in an approximately central site of the dust collection electrode for application of a high voltage between the dust collection electrode and the electric discharge electrode such that electric discharge occurs at a tip end portion of the electric discharge electrode to electrically charge and collect dust particles in the air that have flowed into the dust collection electrode, in which the dust collector is disposed for each of at least one of the plurality of propellers, the dust collector is assembled to each propeller of the drone such that the electric discharge electrode is positioned at approximately the center above each propeller, and the position where the dust collection electrode is arranged in the dust collector is set such that the central position in the height direction of the dust collection electrode is equal to or higher than the position of the rotational plane of each propeller and the lower end position of the dust collection electrode is equal to or lower than the position of an upper vicinity of the rotational plane of each propeller, so that air can be taken into the dust collection electrode by a rotational force of each propeller.

With this configuration, when the drone is in a floating state and the dust collector is activated to apply a high voltage between the dust collection electrode and the electric discharge electrode in the dust collector, dust particles in the air that have flowed into the dust collection electrode are electrically charged and collected by the dust collection electrode.

The position where the dust collection electrode is arranged in the dust collector is then set such that the central position in the height direction of the dust collection electrode is equal to or higher than the position of the rotational plane of each propeller and the lower end position of the dust collection electrode is equal to or lower than the position of an upper vicinity of the rotational plane of each propeller, which allows air on the air intake side that has flowed into the dust collection electrode in the dust collector to be mainly ionized and also a desired volume of air to be taken into the dust collection electrode.

The invention of claim 3 is the air cleaner according to claim 1 or 2, in which the dust collection electrode in the dust collector has a plurality of holes for surrounding air to flow therethrough.

With this configuration, air can flow into the dust collection electrode not only through the upper opening but also through the plurality of holes so as to flow smoothly without being blocked by the dust collection electrode, As a result, the drone can fly stably.

The invention of claim 4 is the air cleaner according to any one of claims 1 to 3, in which the dust collection electrode in the dust collector is set such that the upper opening has a diameter larger than that of the lower opening.

With this configuration, a large volume of air can flow through the upper opening having such a large diameter into the dust collection electrode and, as a result, the drone can fly stably.

The invention of claim 5 is the air cleaner according to any one of claims 1 to 4, in which the dust collector is assembled detachably to the drone.

With this configuration, the dust collector can be attached easily to and detached easily from the drone and, as a result, can be repaired and maintained easily.

The invention of claim 6 is the air cleaner according to any one of claims 1 to 5, in which the dust collection electrode in the dust collector s set to have a maximum diameter of 10 cm or more and a height of 2.5 cm or more.

The invention of claim 7 is the air cleaner according to any one of claims 1 to 6, in which an aluminum deposited film or a vinyl chloride sheet is provided on the inner surface of the dust collection electrode in the dust collector.

Effects of the Invention

As described in detail hereinbefore, with the air cleaner according to the present invention, air ions can move across the wide space between the electric discharge electrode and the dust collection electrode to collect a large amount of dust particles that have flowed into the wide space, exhibiting an excellent effect of highly increased dust collecting capability.

The height position of the dust collector is also set such that air on the air intake side that has flowed into the dust collection electrode can be mainly ionized and additionally a desired volume of air can flow reliably into the dust collection electrode, exhibiting an effect of further increased dust collecting capability.

In addition, the dust collector, which is composed of the single dust collection electrode and the electric discharge electrode, can be reduced in weight and achieve smooth air flow and, with this configuration, can be maintained only by cleaning the surface of the single dust collection electrode without disassembling.

In particular, the invention of claim 3 exhibits an effect that air can flow smoothly without being blocked by the dust collection electrode and the dust collection electrode can be reduced in weight.

The invention of claim 4 also exhibits an effect that a large volume of air can flow smoothly into the dust collection electrode.

The invention of claim 5 further exhibits an effect that the dust collector can be repaired and maintained easily.

BRIEF DESCRIPTION OF THE DRAWINGS

FIG. 17 is a table diagram showing size settings for ten types of dust collection electrodes.

FIG. 18 is a table diagram showing results of the first experiment.

FIG. 20 is a table diagram showing results of the second experiment.

DESCRIPTION OF THE EMBODIMENTS

The best modes of the present invention will hereinafter be described with reference to the accompanying drawings.

First Embodiment

Figure 1:
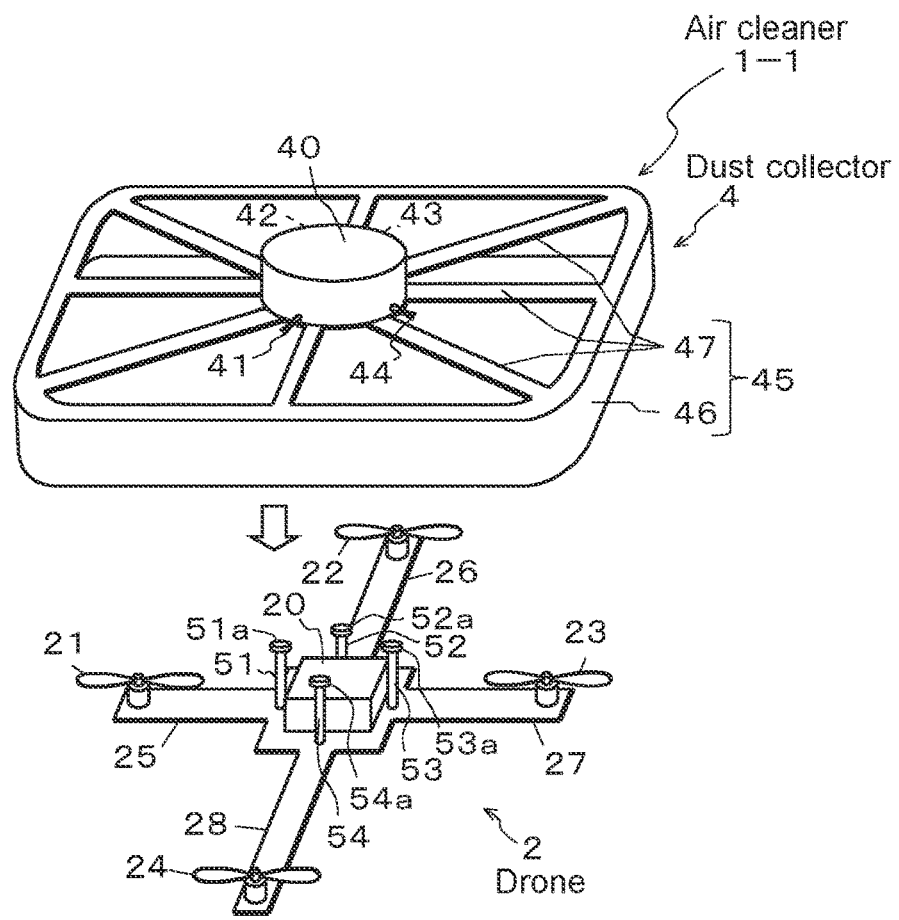
FIG. 1 is an exploded perspective view showing an air cleaner according to a first embodiment of the present invention.
Figure 2:
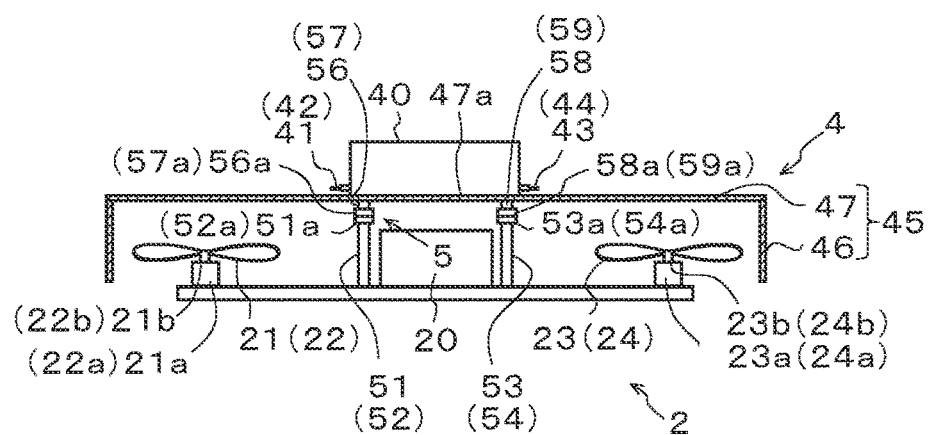
FIG. 2 is a schematic cross-sectional view of the air cleaner.

FIG. 1 is an exploded perspective view showing an air cleaner according to a first embodiment of the present invention and FIG. 2 is a schematic cross-sectional view of the air cleaner.

As shown in FIGS. 1 and 2, the air cleaner 1-1 of this embodiment has a configuration in which a single dust collector 4 is assembled to a drone 2.

The drone 2 is a rotor-type one floatable vertically and horizontally by propulsion of the propellers. Rotor-type drones include a wide variety of rotor-driven ones such as a tri-rotor having three propellers, a quad-rotor having four propellers, a penta-rotor having five propellers, a hexa-rotor having six propellers, an octa-rotor having eight propellers, etc. In this embodiment, a quad-rotor drone is applied as the drone 2.

Figure 3:
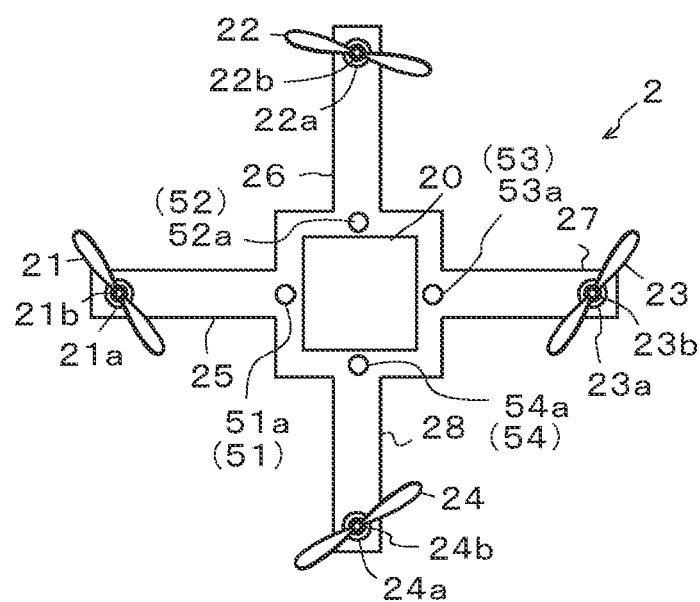
FIG. 3 is a plan view of a drone.

FIG. 3 is a plan view of the drone 2.

As shown in FIG. 3, the drone 2 has a main body unit 20 and four propellers 21 to 24 arranged around the main body unit 20.

The propellers 21 to 24 are attached, respectively, to tip end portions of four frames 25 to 28 that extend outward from the main body unit 20 in a cross shape. Specifically, a motor 21*a* (22*a* to 24*a*) is attached on top of the tip end of each frame 25 (26 to 28), and each propeller 21 (22 to 24) is fixed to the rotary shaft 21*b* (22*b* to 24*b*) of each motor 21*a* (22*a* to 24*a*), With this configuration, the propeller 21 (22 to 24) is arranged to be driven by the motor 21*a* (22*a* to 24*a*) to rotate together with the rotary shaft 21*b* (22*b* to 24*b*) to thereby take in air from above and exhaust air below. That is, the propeller 21 (22 to 24) provides upward propulsion to the drone 2.

In FIGS. 1 and 2, the dust collector 4 is arranged to collect dust in the air through electric discharge and has four electric discharge electrodes 41 to 44 and a dust collection electrode 45.

Figure 4:
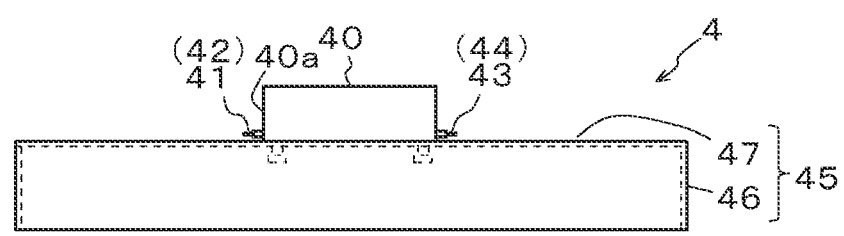
FIG. 4 is a side view of a dust collector.
Figure 5:
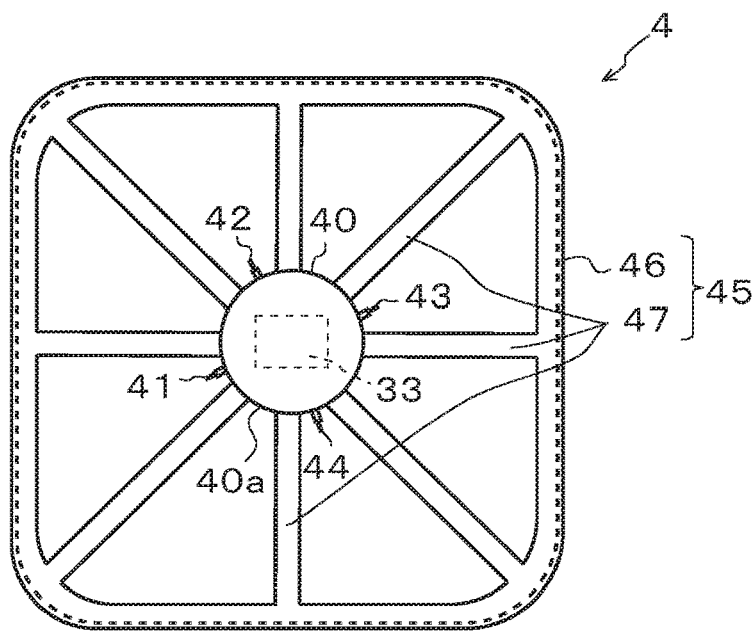
FIG. 5 is a plan view showing the top surface of the dust collector.
Figure 6:
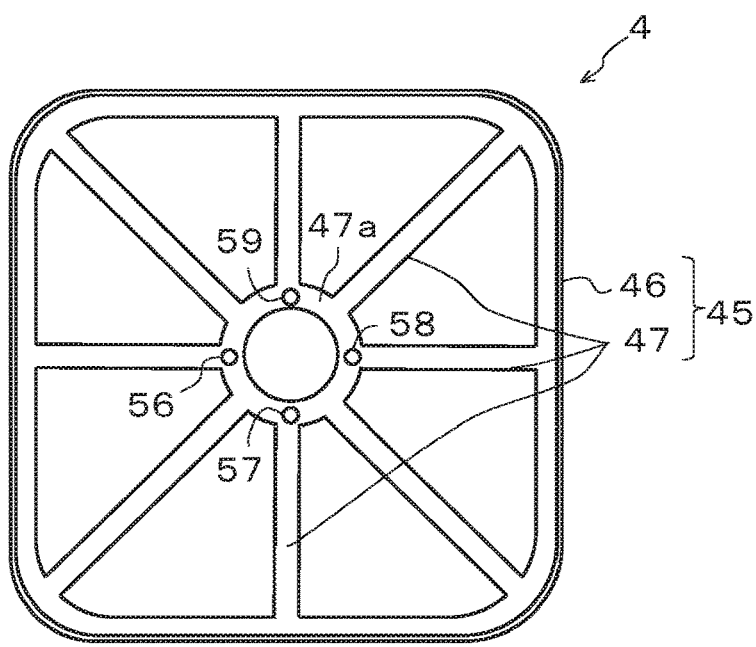
FIG. 6 is a plan view showing the bottom surface of the dust collector.

FIG. 4 is a side view of the dust collector 4, FIG. 5 is a plan view showing the top surface of the dust collector 4, and FIG. 6 is a plan view showing the bottom surface of the dust collector 4.

The electric discharge electrodes 41 to 44 are electrically conductive carbon brushes and, as shown in FIG. 4, attached to the peripheral surface 40a of a central chamber 40 that is installed on the upper surface of the dust collection electrode 45.

Specifically, as shown in FIG. 5, the electric discharge electrodes 41 to 44 are assembled at 90-degree intervals to the peripheral surface 40a of the central chamber 40 with tip end portions thereof being exposed, and base end portions of the electric discharge electrodes 41 to 44 are connected to a booster unit 33 within the central chamber 40. The central chamber 40 is then attached to a central chamber attachment portion 47a (to be described below) of the dust collection electrode 45.

The dust collection electrode 45 is arranged to electrostatically attract and collect electrically charged dust and composed of a quadrilateral cylindrical dust collection electrode main body 46 opened upward and downward and a plurality of ribs 47 supporting the dust collection electrode main body 46 and the central chamber 40.

Specifically, as shown in FIG. 6, the plurality of ribs 47 run from the upper edge to the central portion of the dust collection electrode main body 46 to be coupled to the ring-shaped central chamber attachment portion 47a provided in the central portion. It is noted that the plurality of ribs 47, the central chamber attachment portion 47a, and the dust collection electrode main body 46 are formed integrally using an electrically conductive member.

Figure 7:
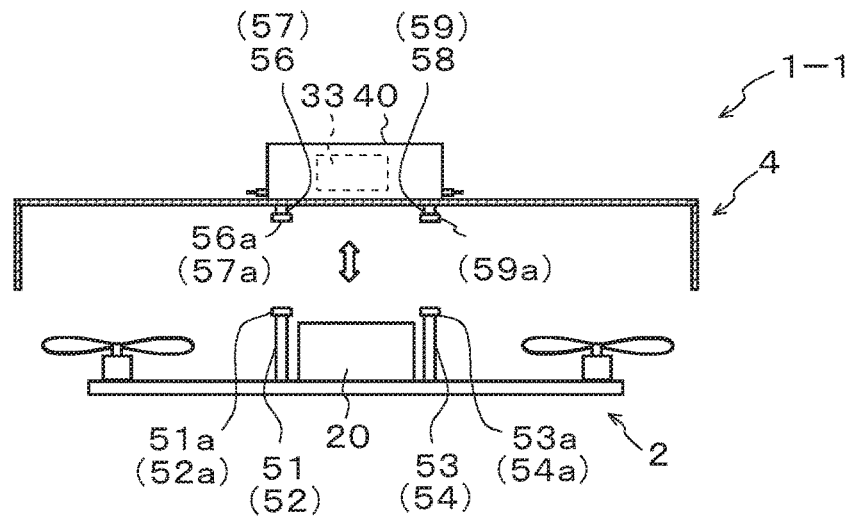
FIG. 7 is a schematic cross-sectional view for illustrating a method of attaching and detaching the dust collector to/from the drone.

FIG. 7 is a schematic cross-sectional view for illustrating a method of attaching and detaching the dust collector 4 to/from the drone 2.

As shown in FIG. 2, the air cleaner 1-1 includes an attaching/detaching mechanism 5 that can freely attach and detach the dust collector 4 to/from the drone 2. The attaching/detaching mechanism 5 is composed of four support posts 51 to 54 provided on the drone 2 and four placement portions 56 to 59 provided on the dust collector 4.

As shown in FIGS. 1 and 3, the support posts 51 to 54 are provided in a standing manner at regular angular intervals around the main body unit 20 of the drone 2, and a magnet piece 51a (52a to 54a) is attached to the upper end of each support post 51 (52 to 54).

On the other hand, as shown in FIGS. 2 and 6, the placement portions 56 to 59 are provided on the lower surface of the central chamber attachment portion 47a of the dust collector 4. The placement portions 56 to 59 are suspended at regular angular intervals at positions corresponding to those of the support posts 51 to 54, and a magnet piece 56a (57a to 59a) is attached to the lower end of each placement portion 56 (57 to 59).

Thus, as shown in FIG. 7, the dust collector 4 is positioned over the drone 2, the central chamber 40 of the dust collector 4 is aligned with the main body unit 20 at approximately the center of the drone 2, and then the dust collector 4 is lowered toward the drone 2, whereby the magnet pieces 56a to 59a of the placement portions 56 to 59 of the dust collector 4 can be placed on the magnet pieces 51a to 54a of the support posts 51 to 54 of the drone 2. As a result, the dust collector 4 is fixed on the drone 2 by magnetic forces between the magnet pieces 56a to 59a and the magnet pieces 51a to 54a.

The dust collector 4 can also be lifted against the magnetic forces between the magnet pieces 56a to 59a and the magnet pieces 51a to 54a to be detached easily from the drone 2.

That is, with the air cleaner 1-1 of this embodiment, the dust collector 4 can be detached easily from the drone 2 and, as a result, can be repaired and maintained easily.

Also, the dust collector 4, which is composed of the dust collection electrode main body 46 and the ribs 47, is placed over the propellers 21 to 24, as described above, to thereby serve as a propeller guard for the propellers 21 to 24.

The drone 2 and the dust collector 4 are arranged to be controlled by the main body unit 20 of the drone 2.

Figure 8:
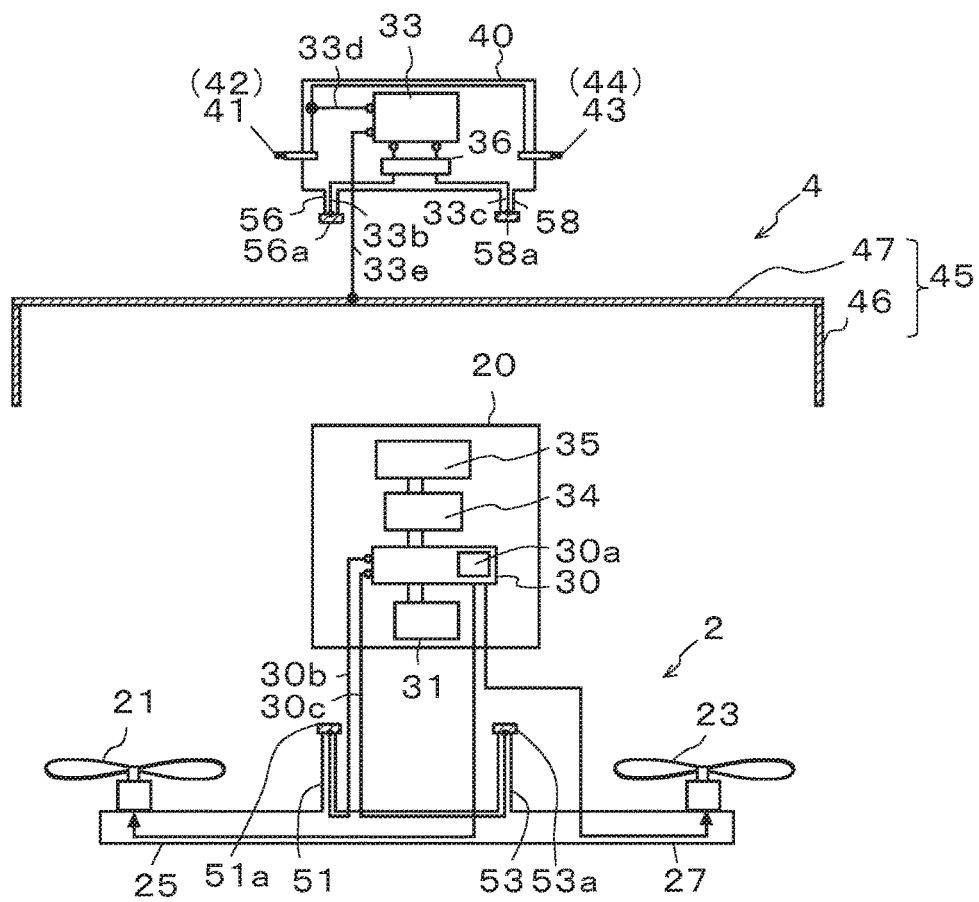
FIG. 8 is a schematic view for illustrating a system to control the drone and the dust collector.

FIG. 8 is a schematic view for illustrating a system to control the drone 2 and the dust collector 4.

As shown in FIG. 8, a control unit 30 having a memory 30a, a power supply unit 31, a reception unit 34, and an antenna 35 are accommodated in the main body unit 20 of the drone 2, while the booster unit 33 is accommodated within the central chamber 40 of the dust collector 4.

The power supply unit 31, the reception unit 34, and the antenna 35 are connected to the control unit 30, and the rotation speed of the motor 21a (22a to 24a) of the propeller 21 (22 to 24) is arranged to be controlled by the control unit 30. Here, a lithium battery with a direct-current voltage of 11.1 V (volt), for example, is used as the power supply unit 31.

Wiring lines 30b, 30c are provided to send a power supply voltage and control signals to the booster unit 33, the wiring lines 30b, 30c are drawn from the control unit 30, respectively, into the support posts 51, 53 and connected to the magnet pieces 51a, 53a.

On the other hand, the dust collector 4 is provided with wiring lines 33b, 33c. The wiring lines 33b, 33c are provided to receive a power supply voltage and control signals from the control unit 30 and connected between input terminals of the booster unit 33 and the magnet pieces 56a, 58a of the placement portions 56, 58.

Wiring lines 33d, 33e are then connected to output terminals of the booster unit 33, the wiring lines 33d, 33e connected, respectively, to the electric discharge electrodes 41 to 44 and the central chamber attachment portion 47a of the dust collection electrode 45. A booster circuit that boosts a direct-current voltage of 5 V up to a high voltage of 6 kV, for example, is used as the booster unit 33. In this embodiment, an insulated DC/DC converter 36 is provided between the wiring lines 33b, 33c of the booster unit 33 and the booster unit 33. The insulated DC/DC converter 36 serves to convert a direct-current voltage of 11.1 V sent from the power supply unit 31 through the wiring lines 33b, 33c into a direct-current voltage of 5V and input the stable direct-current voltage of 5 V to the booster unit 33.

That is, when the dust collector 4 is attached to the drone 2 as shown in FIG. 7, the control unit 30 of the main body unit 20 and the booster unit 33 of the central chamber 40 are electrically connected through the wiring lines 30b, 30c, the magnet pieces 51a, 53a, the magnet pieces 56a, 58a, the wiring lines 33b, 33c, and the insulated DC/DC converter 36. As a result, a direct-current voltage of 11.1 V from the power supply unit 31 is input through the control unit 30 to the insulated DC/DC converter 36 and converted into a stable direct-current voltage of 5 V. The direct-current voltage of 5 V is then input to the booster unit 33 to be boosted to a high voltage of 6 kV and applied between the electric discharge electrodes 41 to 44 and the dust collection electrode main body 46.

It is noted that in this embodiment, the electric discharge electrodes 41 to 44 are set to be negative, while the dust collection electrode 45 is set to be positive. Further, the dust collector 4 and the drone 2 are insulated almost completely. Specifically, the dust collector 4 is assembled to the drone 2 such that the ribs 47 and the dust collection electrode main body 46 are not in contact with the frames 25 to 28 of the drone 2. The drone 2 and the dust collector 4 are in contact with each other only through the support posts 51 to 54 and the placement portions 56 to 59. The support posts 51 to 54 and the placement portions 56 to 59 are then formed entirely of an insulating material except for the magnet pieces 51*a* to 54*a*, 56*a* to 59*a* and the wiring lines 33*b*, 33*c*. The central chamber 40 of the dust collector 4 is also formed of an insulating material.

Incidentally, the control flight of the drone 2 is broadly classified as automated control flight and piloted control flight. The automated control flight is, for example, a flight mode in which prepared 3D (three-dimensional) drawing data of a to-be-cleaned space is stored preliminarily in the control unit 30 and, based on the 3D drawing data and a control program, the control unit 30 causes the drone 2 to fly in a desired area of the space. On the other hand, the piloted control flight is a flight mode in which the drone 2 is piloted manually at close range or long range using a dedicated pilot manipulator, a portable pilot manipulator, a smartphone, a GPS, etc. In both of the control flights, the drone 2 can fly in the entire space or can be made to fly only in a predetermined area or at a predetermined height.

Systems for the automated control flight and the piloted control flight have heretofore been known and either of the control systems can be applied to the drone 2.

In this embodiment, a system is applied that can provide both the automated control flight and the piloted control flight. That is, the control unit 30 can control the propellers 21 to 24 based on data such as a control program and a 3D drawing stored in the memory 30*a*. In addition, the control unit 30 can receive, at the reception unit 34 through the antenna 35, external command radio waves and/or GPS radio waves and, based on the received radio waves, control the propellers 21 to 24 and the booster unit 33.

Figure 9:
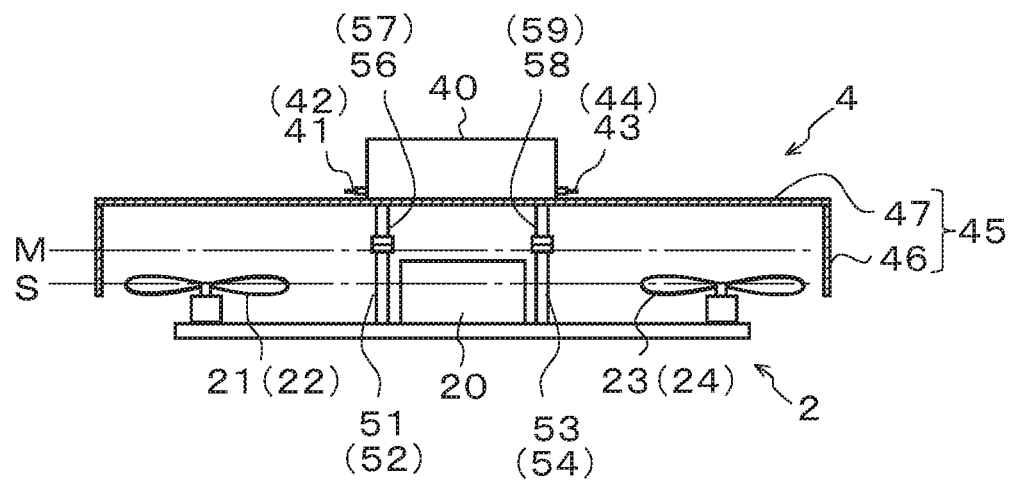
FIG. 9 is a schematic cross-sectional view showing a state where the dust collector is mounted at the lowest position.
Figure 10:
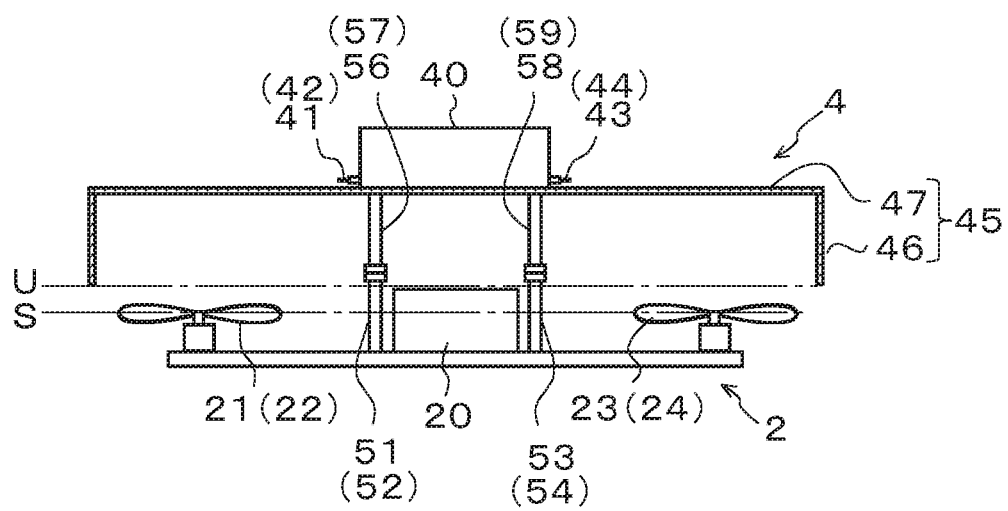
FIG. 10 is a schematic cross-sectional view showing a state where the dust collector is mounted at the highest position.

FIG. 9 is a schematic cross-sectional view showing a state where the dust collector 4 is mounted at the lowest position, while FIG. 10 is a schematic cross-sectional view showing a state where the dust collector 4 is mounted at the highest position.

As shown in FIG. 7, by placing the placement portions 56 to 59 of the dust collector 4 on the support posts 51 to 54 of the drone 2, the dust collector can be assembled to the main body unit of the drone such that the central chamber 40 having the electric discharge electrodes 41 to 44 is positioned directly above the main body unit 20 that is positioned at approximately the center on the drone 2. At this time, the height position of the dust collector 4 with respect to the drone 2 depends on the length of the placement portions 56 to 59 of the dust collector 4, as shown in FIGS. 9 and 10.

Incidentally, the propellers 21 to 24 of the drone 2 shown in FIG. 9, when being rotated, take in air from above the rotational plane S of the propellers 21 to 24 and exhaust air below the rotational plane S. At this time, air flowing from above into the rotational plane S has a speed much slower than that of air flowing out from the rotational plane S below. This allows a larger amount of dust particles to be electrically charged by ionizing air above the rotational plane S of the propellers 21 to 24 through electric discharge than by ionizing air below the rotational plane S through electric discharge.

Focusing on the points above, in this embodiment, the dust collector 4 is set at the lowest position when the central position M in the height direction of the dust collection electrode 45 is aligned with the rotational plane S of the propellers 21 to 24, as shown in FIG. 9.

However, if the height position of the dust collector 4 is too high with respect to the propellers 21 to 24, air cannot be taken sufficiently into the dust collection electrode 45. It is necessary to set the dust collector 4 at a height position at which a minimum necessary amount of air can be taken in by rotational forces of the propellers 21 to 24.

Focusing on the points above, in this embodiment, the dust collector 4 is set at the highest position when the lower end position U of the dust collection electrode 45 is aligned with the position of an upper vicinity of the rotational plane S of the propellers 21 to 24, as shown in FIG. 10, That is, in this embodiment, the dust collector 4 is assembled onto the drone 2 such that the central position M of the dust collection electrode 45 is equal to or higher than the position of the rotational plane S of the propellers 21 to 24 and the lower end position U of the dust collection electrode 45 is equal to or lower than the position of an upper vicinity of the rotational plane S of the propellers 21 to 24.

Next will be described operations and effects of the air cleaner 1-1 of this embodiment.

Figure 11:
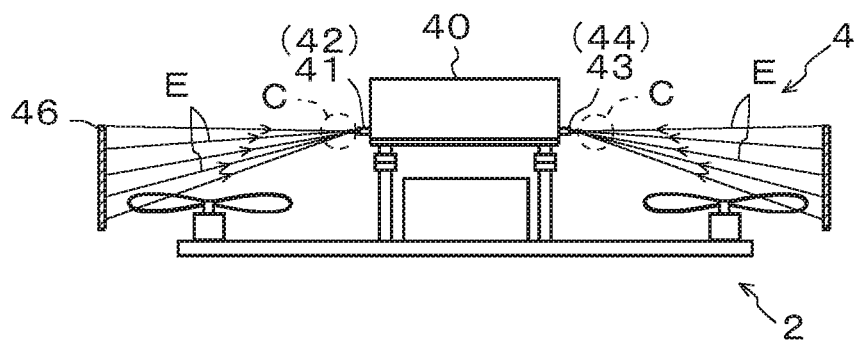
FIG. 11 is a schematic cross-sectional view showing a state of electric field concentration.
Figure 12:
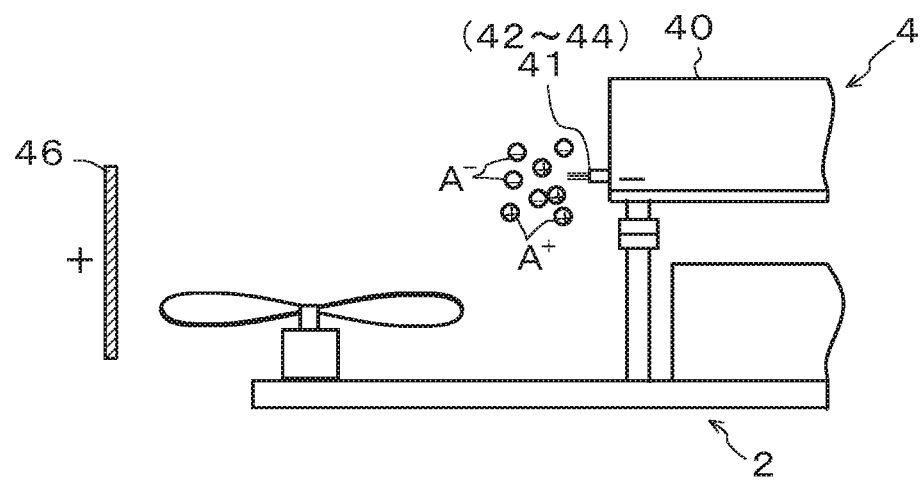
FIG. 12 is a schematic partial cross-sectional view showing a state of air ion generation.
Figure 13:
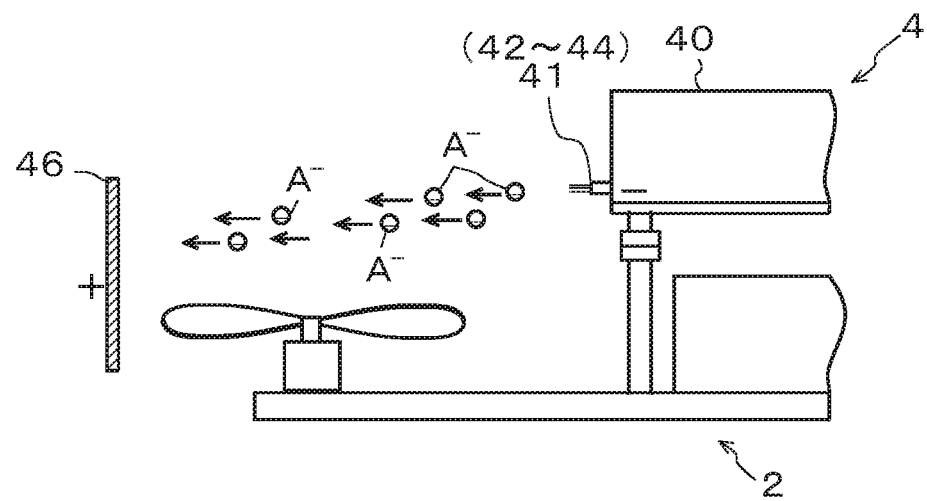
FIG. 13 is a schematic partial cross-sectional view showing air ion flow.

FIG. 11 is a schematic cross-sectional view showing a state of electric field concentration, FIG. 12 is a schematic partial cross-sectional view showing a state of air ion generation, and FIG. 13 is a schematic partial cross-sectional view showing air ion flow.

As shown in FIG. 2, when the propellers 21 to 24 are rotated at a desired rotational speed under control of the control unit 30 (see FIG. 8) with the dust collector 4 being assembled onto the drone 2, upward propulsion is generated to cause the air cleaner 1-1 to float.

In this floating state of the air cleaner 1-1, when a predetermined direct-current voltage is input from the power supply unit 31 to the booster unit 33 under control of the control unit 30 shown in FIG. 8, this voltage is boosted to a high voltage through the booster unit 33, and the high voltage is applied between the electric discharge electrodes 41 to 44 and the dust collection electrode main body 46.

This causes an electric field E to be generated between the negative electric discharge electrodes 41 to 44 and the positive dust collection electrode main body 46 as shown in FIG. 11, and the electric field E is concentrated at the tip end portions of the electric discharge electrodes 41 to 44 as indicated by the circled dashed lines C.

As a result, electric discharge such as corona discharge occurs and, as shown in FIG. 12, a large number of positive air ions $A^+$ and negative air ions $A^-$ are generated in the vicinity of the tip ends of the electric discharge electrodes 41 to 44. Then, as shown in FIG. 13, positive air ions $A^+$ are captured by the negative electric discharge electrodes 41 to 44, while negative air ions $A^-$ move toward the positive dust collection electrode main body 46.

Figure 14:
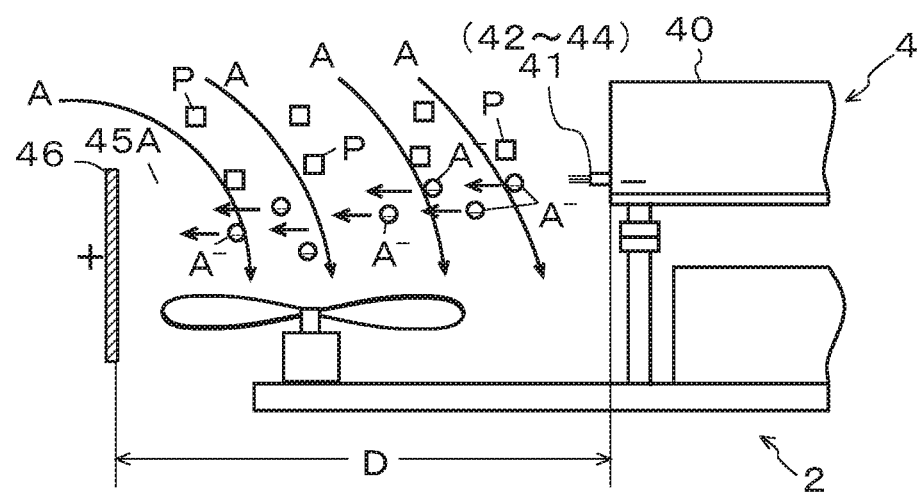
FIG. 14 is a schematic cross-sectional view showing a state of dust-containing air inflow.
Figure 15:
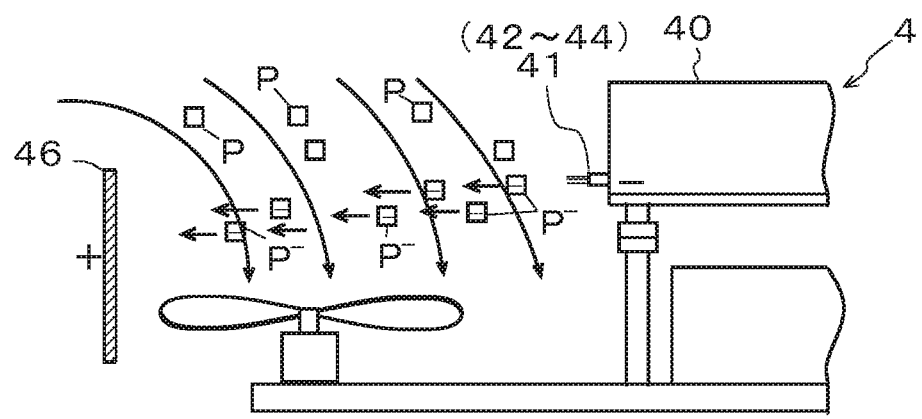
FIG. 15 is a schematic cross-sectional view showing a state of movement of electrically charged dust.

FIG. 14 is a schematic cross-sectional view showing a state of inflow of air A containing dust P and FIG. 15 is a schematic cross-sectional view showing a state of movement of electrically charged dust P.

In a state where negative air ions $A^-$ move toward the positive dust collection electrode main body 46 as shown in FIG. 14, air A containing dust P flows through the upper opening 45A into the dust collection electrode main body 46.

This results in air ions $A^-$ colliding with dust P to generate negatively charged dust $P^-$, as shown in FIG. 15. The thus electrically charged dust $P^-$ moves toward and captured by the positive dust collection electrode main body 46.

As described heretofore, since the air cleaner 1-1 of this embodiment is configured such that air ions $A^-$ move within the wide space D between the electric discharge electrodes 41 to 44 and the dust collection electrode main body 46 and a large volume of air A flows into the wide space D as shown in FIG. 14, a large amount of dust P can be collected at one time.

Also, since the dust collector 4 of the air cleaner 1-1 is composed of the single dust collection electrode 45 and the electric discharge electrodes 41 to 44 as shown in FIG. 1, the dust collector 4 can be reduced in weight and air can flow smoothly into the dust collection electrode main body 46. Further, with this configuration, the dust collector 4 can be maintained only by cleaning the surface of the single dust collection electrode 45 without disassembling the dust collector.

The inventors have carried out two experiments.

The first experiment was conducted to confirm the relationship between the size of the dust collection electrode of the dust collector and the dust collection rate.

Figure 16:
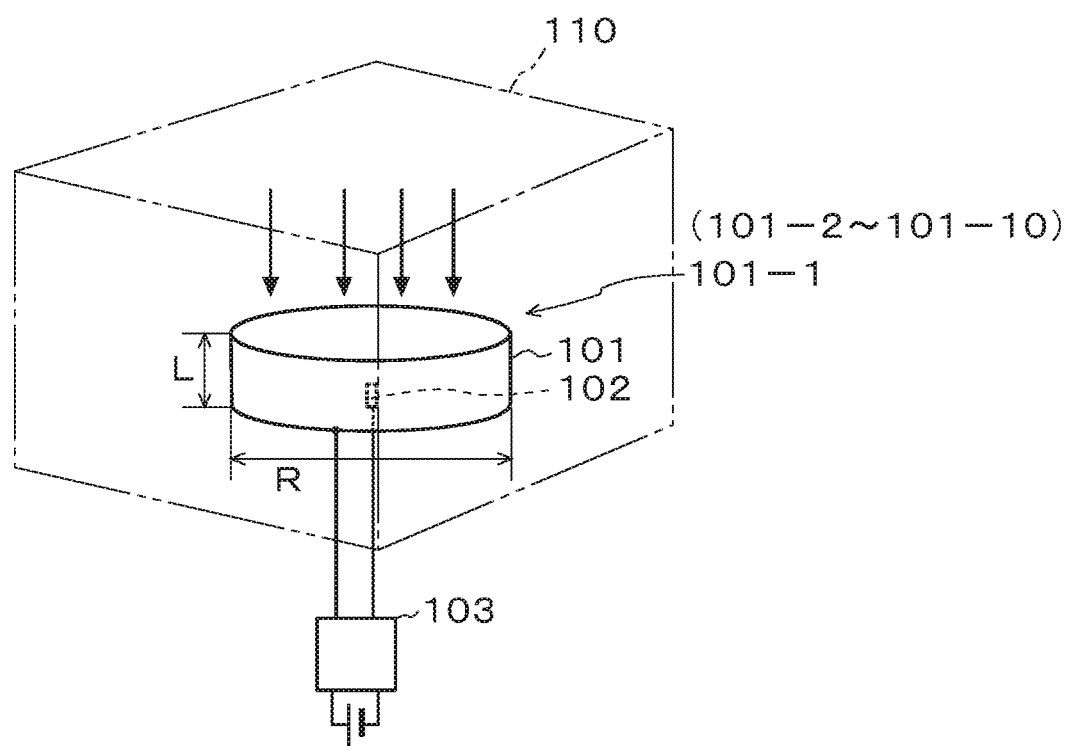
FIG. 16 is a schematic view showing a device fora first experiment.

FIG. 16 is a schematic view showing a device for the first experiment and FIG. 17 is a table diagram showing size settings for ten types of dust collection electrodes.

As shown in FIG. 16, in this embodiment, a dust collector 100-1 (100-2 to 100-10) was arranged in an upward facing manner within an acryl chamber 110 with a volume of 2.744 $m^3$ and the particle concentration of an incense stick within the chamber 110 was measured to obtain the dust collection rate of each dust collector 100-1 (100-2 to 100-10).

Specifically, each dust collector 100-1 (100-2 to 100-10) was formed of a dust collection electrode 101 and a carbon brush-shaped electric discharge electrode 102 arranged at the center of the dust collection electrode 101, and a direct-current voltage of 6 kV from a booster circuit 103 was applied between the dust collection electrode 101 and the electric discharge electrode 102 to activate each dust collector 100-1 (100-2 to 100-10).

The chamber 110 was also filled with smoke from an incense stick not shown and, at the time the smoke from the incense stick was stabilized, propellers of a drone (not shown) arranged below the dust collector 100-1 (100-2 to 100-10) were rotated at a predetermined rotational speed such that air flowed at a wind speed of 1.5 m/s from above into the dust collector 100-1 (100-2 to 100-10).

In this embodiment, ten types in size of dust collectors 100-1 to 100-10 were used as shown in FIG. 17. That is, the ten types of dust collectors 100-1 to 100-10 had their respective different combinations (L, R) of the height L (cm) and the diameter R (cm) of the dust collection electrode 101: (1.25, 10), (2.5, 10), (5, 10), (2.5, 20), (5, 20), (10, 20), (2.5, 5), (5, 5), (10, 10), and (1,25, 5).

In the experiment, each dust collector 100-1 (100-2 to 100-10) was arranged and activated within the chamber 110 and, in this state, the particle concentration of the incense stick was measured for ten minutes. Also, the experiment was conducted two times with different durations for each dust collector 100-1 (100-2 to 100-10) and the particle concentration values of the two measurements were averaged to obtain the dust collection rate of each dust collector 100-1 (100-2 to 100-10). It is noted that the experiment was conducted four times with different durations for each of the dust collectors 100-3 and 100-5.

FIG. 18 is a table diagram showing results of the first experiment.

FIG. 18 shows attenuation rate $\lambda$ (1/min), natural attenuation $\lambda_o$ (1/min), CADR ($m^3$/min: Clean Air Delivery Rate), and dust collection rate for each dust collector 100-1 (100-2 to 100-10). Here, CADR is obtained by multiplying the difference between the attenuation rate and the natural attenuation by the volume of the chamber 110, that is, $(\lambda-\lambda_o) \times V$ The dust collection rate is obtained by dividing CADR by the air volume Q passing through the dust collection electrode 101, that is, CADR/Q.

As shown in FIG. 18, it was confirmed from this experiment that the greater both the electrode height L and the diameter R, the higher the attenuation rate and CADR, while the smaller the diameter R, the higher the dust collection.

The second experiment was conducted to confirm the relationship between the size of the dust collection electrode of the dust collector and the number of diffused ions.

Figure 19:
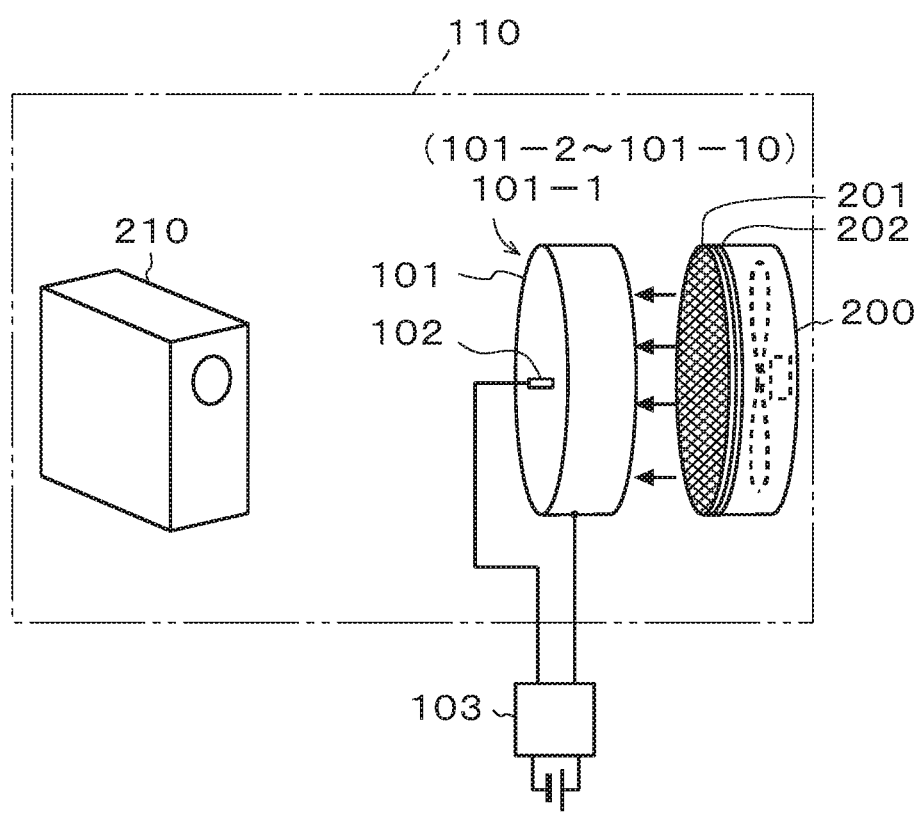
FIG. 19 is a schematic view showing a device for a second experiment.

FIG. 19 is a schematic view showing a device for a second experiment, As shown in FIG. 19, in this embodiment, a dust collector 100-1 (100-2 to 100-10) was arranged in a lateral facing manner within a chamber 110 and a circulator 200 was arranged at 10 cm to the right of the dust collector, At this time, two honeycomb meshes 201, 202 having their respective different mesh sizes were laid one on top of the other and set on the front surface of the circulator 200 to ensure uniform wind speed distribution through the circulator 200, An ionic number measuring instrument 210 was then arranged at 50 cm to the left of the dust collector 100-1 (100-2 to 100-10).

When the dust collector 100-1 (100-2 to 100-10) is activated, negative ions (air ions $A^-$ in FIG. 2) are generated at the tip end portion of the electric discharge electrode 102 and move toward the dust collection electrode 101, However, when a wind from the circulator 200 flows through the dust collection electrode 101 in the dust collector 100-1 (100-2 to 100-10), the negative ions are diffused to the outside of the dust collection electrode 101.

The thus diffused negative ions were measured using the ionic number measuring instrument 210 and their concentration was obtained to measure the number of ions.

Specifically, a wind with varying speed was delivered from the circulator 200 into each dust collector 100-1 (100-2 to 100-10) in an activated state while checking the humidity within the chamber 110.

The circulator 200 had four types of wind speed settings A to D. In the setting A, the average wind speed v1 within a region having a radius of 5 cm from the center of the front surface of the circulator 200 was 1.5 m/s, the average wind speed v2 within a region having a radius of 10 cm from the center was 1.55 m/s, and the average wind speed v3 within a region having a radius of 20 cm from the center was 1.38 m/s. In the settings B, C, and D, the average wind speeds (v1, v2, v3) were then (0.90 m/s, 0.90 m/s, 0.79 m/s), (0.65 m/s, 0.63 m/s, 0.60 m/s), and (0.50 m/s, 0.49 m/s, 0.47 m/s), respectively.

In the experiment, a wind was delivered to each dust collector 100-1 (100-2 to 100-10) while the circulator 200 had the varying wind speed settings A to D and, based on the number of negative ions measured by the ionic number measuring instrument 210 at each wind speed setting, the concentration of negative ions was obtained. At this time, the experiment was conducted two times for the dust collectors 100-1, 100-3, 100-4, and 100-6 to 100-10, while being conducted three times for the dust collectors 100-2 and 100-5.

FIG. 20 is a table diagram showing results of the second experiment.

As shown in FIG. 20, it was confirmed that the greater the diameter R of the dust collection electrode 101 in the dust collector, the larger the number of diffused ions, and the smaller the height L of the dust collection electrode 101 in the dust collector, the larger the number of diffused ions. It was also confirmed that the dust collectors having the same ratio of the diameter R and the height L of the dust collection electrode 101 exhibit similar characteristics and that if the diameter R is 5 cm, no ions are diffused.

It can be seen that configurations in which negative ions can be kept within the dust collector without being diffused to the outside of the dust collector and at the same time electrically charged dust particles can also be collected successfully have a high dust collection rate, This can then be confirmed by comparing the results of the first and second experiments, showing that "samples with a high dust collection rate" correspond to "samples without negative ion diffusion." Accordingly, the greater the electrode height L and the smaller the diameter R, the higher the dust collection rate. However, the dust collecting capability CADR, which is the final problem, is proportional to the air volume Q that can be processed. The air volume Q can be assumed to be approximately proportional to the cross-sectional area of the dust collector through which a wind passes and proportional to the square of the diameter R. It can be confirmed from the results of the first experiment that the greater both the electrode height L and the diameter R, the greater the dust collecting capability CADR.

(First Variation)

Figure 21:
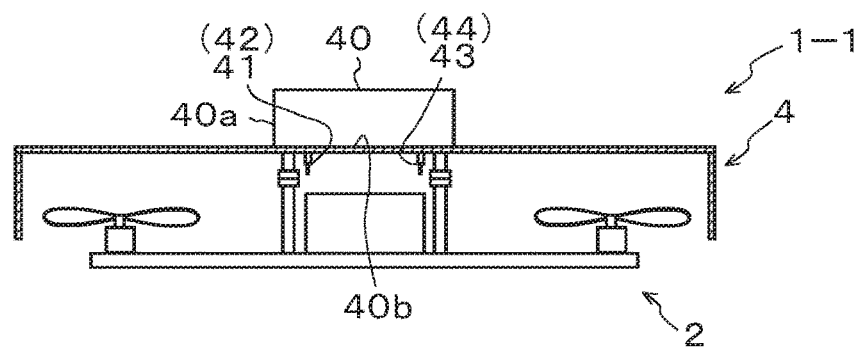
FIG. 21 is a schematic cross-sectional view showing a variation of the first embodiment.

FIG. 21 is a schematic cross-sectional view showing a variation of the first embodiment.

The electric discharge electrodes 41 to 44 may be attached to the lower surface 40b of the central chamber 40 in a manner protruding downward from the central chamber 40 as shown in FIG. 21, although being attached to the peripheral surface 40a of the central chamber 40 in the above-described first embodiment.

Second Embodiment

Next will be described a second embodiment of the present invention.

Figure 22:
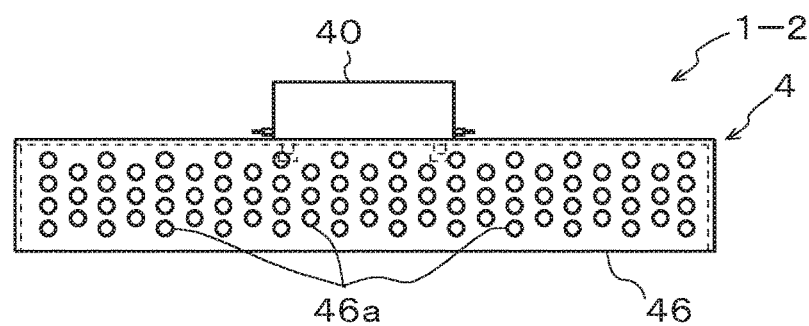
FIG. 22 is a side view of a dust collector serving as a substantial part of a second embodiment of the present invention.
Figure 23:
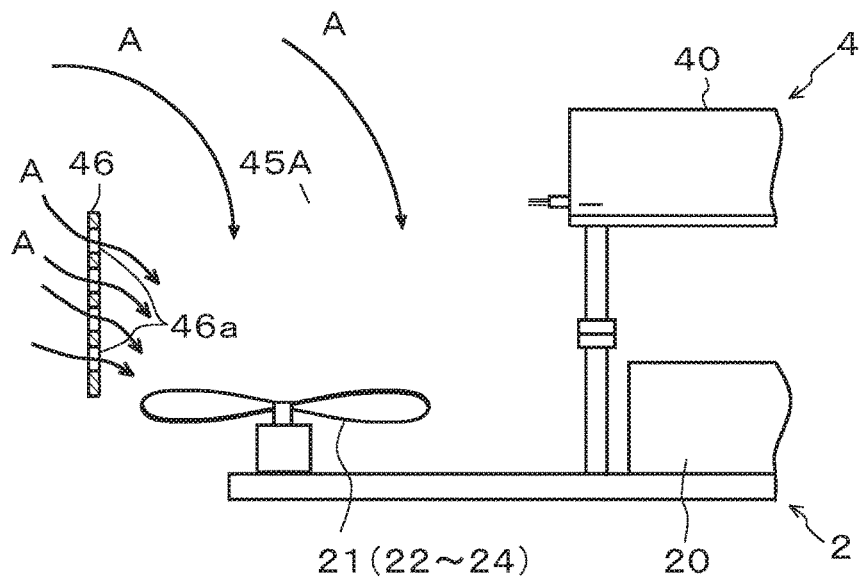
FIG. 23 is a schematic partial cross-sectional view showing air flow.

FIG. 22 is a side view of a dust collector serving as a substantial part of the second embodiment of the present invention and FIG. 23 is a schematic partial cross-sectional view showing flow of air A.

As shown in FIG. 22, the air cleaner 1-2 of this embodiment is different from that of the above-described first embodiment in that the dust collection electrode main body 46 of the dust collector 4 has a plurality of holes 46a.

That is, the dust collection electrode main body 46 is bored with a plurality of circular or elliptical holes 46a penetrating through the dust collection electrode main body 46, whereby as shown in FIG. 23, when the propeller 21 (22 to 24) is rotated, air A flows into the dust collection electrode main body 46 not only through the upper opening 45A of the dust collection electrode main body 46 but also through the plurality of holes 46a.

Accordingly, the air cleaner 1-2 of this embodiment can be reduced in weight through boring of the plurality of holes 46a and air A can flow smoothly, whereby the drone 2 can fly stably.

That is, if the propeller 21 (22 to 24) is surrounded by the dust collection electrode main body 46, no air A would be taken in toward the propeller 21 (22 to 24) and thereby the air pressure on the air intake side of the propeller 21 (22 to 24) would decrease. The propeller 21 (22 to 24) might then have unnecessary loads or generate abnormal noises to require large amounts of electric power to drive the propeller 21 (22 to 24) or, in some cases, the drone 2 might not fly.

Hence, providing the plurality of holes 46a in the dust collection electrode main body 46 of the dust collection electrode 45 as in this embodiment allows air A to flow into the dust collection electrode main body 46 not only through the upper opening 45A but also through the plurality of holes 46a, As a result, the air A is not blocked by the dust collection electrode main body 46 and flows smoothly into the propeller 21 (22 to 24), whereby the drone 2 can fly stably.

Incidentally, providing the plurality of holes 46a in the dust collection electrode main body 46 of the dust collector 4 may cause reduction in the electrode area of the dust collection electrode main body 46 and influence the dust collecting capability of the dust collector 4.

Hence, the inventors have carried out a comparative experiment for he dust collecting capability of dust collectors 4 with and without holes 46a.

Figure 24:
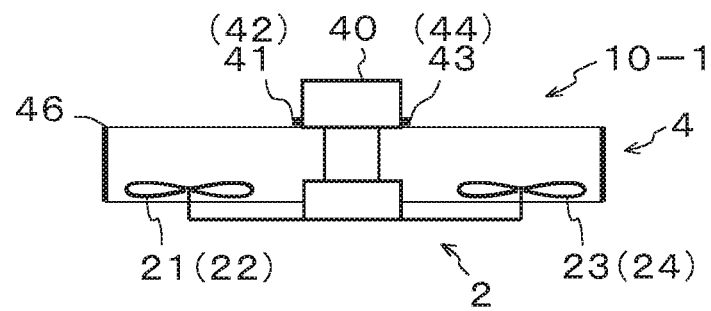
FIG. 24 is a schematic view showing two types of air cleaners used in an experiment.

FIG. 24 is a schematic view showing two types of air cleaners used in the experiment.

The air cleaner 10-1 shown in FIG. 24 has approximately the same structure as the air cleaner 1-1 of the first embodiment, that is, has no hole 46a in the dust collection electrode main body 46. On the other hand, the air cleaner 10-3 shown in FIG. 24 has approximately the same structure as the air cleaner 1-2 of the second embodiment, that is, has holes 46a in the dust collection electrode main body 46. The air cleaners 10-1, 10-3 have the same size.

In the experiment, as is the case with the experiment for the dust collection rate shown in FIG. 16, each air cleaner 10-1 (10-3) was arranged within the chamber 110 and the particle concentration of an incense stick within the chamber 110 was measured to obtain the attenuation rate and CADR of each air cleaner 10-1 (10-3).

That is, the chamber 110 was filled with smoke from an incense stick not shown and, at the time the smoke from the incense stick was stabilized, the air cleaner 10-1 (10-3) was activated to measure the particle concentration of the incense stick for ten minutes. The experiment was conducted two times for each air cleaner 10-1 (10-3) and the particle concentration values of the two measurements were averaged to obtain the attenuation rate and CADR of each air cleaner 10-1 (10-3).

Figure 25:
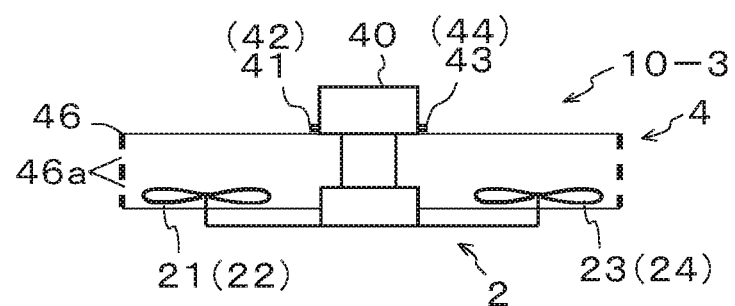
FIG. 25 is a table diagram showing results of the experiment.

FIG. 25 is a table diagram showing results of the experiment.

FIG. 25 shows attenuation rate λ (1/min) and CADR ($m^3$/min) for each air cleaner 10-1 (10-3).

As shown in FIG. 25, the two types of air cleaners 10-1, 10-3 have approximately the same attenuation rate and CADR. It can be determined that the air cleaners 10-1, 10-3 only show a difference within the range of experimental errors, that is, hardly show a difference.

That is, it was confirmed from this experiment that there is no difference in the dust collecting capability between the air cleaner having the plurality of holes 46a and the air cleaner having no hole 46a and that the reduction in the electrode area of the dust collection electrode main body 46 by the holes 46a has almost no influence on the dust collecting capability of the dust collector 4.

Since the other configurations, operations, and effects are the same as those in the above-described first embodiment, the description thereof will be omitted.

(Second Variation)

Figure 26:
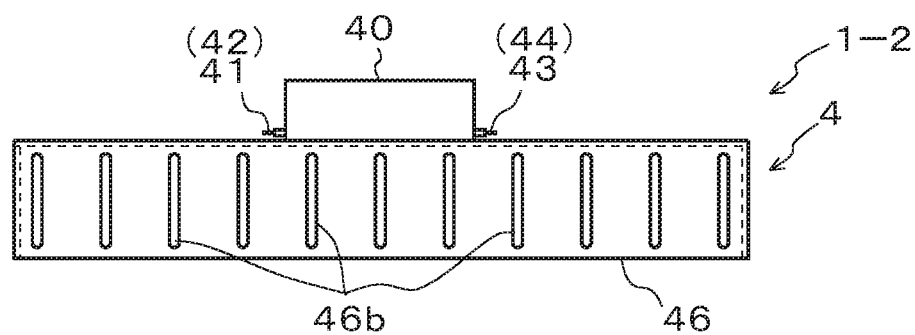
FIG. 26 is a side view showing a variation of the second embodiment.

FIG. 26 is a side view showing a variation of the second embodiment.

The above-described second embodiment shows the case where circular or elliptical holes 46a are provided in the dust collection electrode main body 46.

However, the holes are not limited to having a circular or elliptical shape. As shown in FIG. 26, vertically elongated slit-shaped holes 46b penetrating through the dust collection electrode main body 46 may be provided at regular intervals in the circumferential direction of the dust collection electrode main body 46.

Third Embodiment

Next will be described a third embodiment of the present invention.

Figure 27:
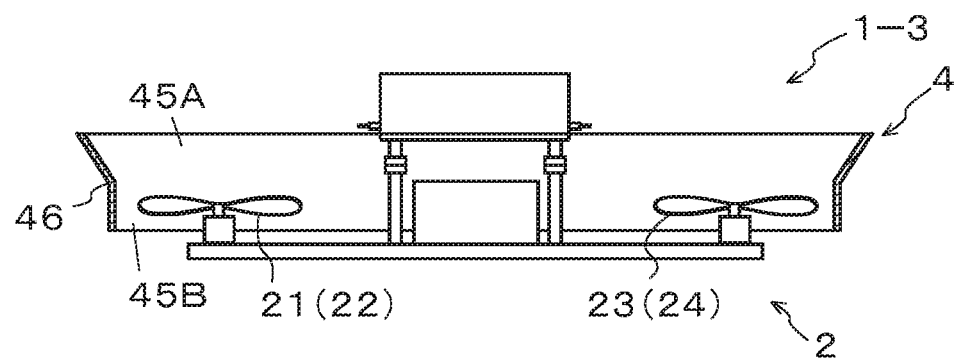
FIG. 27 is a schematic cross-sectional view showing an air cleaner according to a third embodiment of the present invention.

FIG. 27 is a schematic cross-sectional view showing an air cleaner according to a third embodiment of the present invention.

As shown in FIG. 27, the dust collector 4 applied to the air cleaner 1-3 of this embodiment includes a cross-sectionally tapered dust collection electrode main body 46.

That is, an upper half portion of the dust collection electrode main body 46 is widened in a tapered manner, so that the opening diameter of the upper opening 45A is greater than the opening diameter of the lower opening 45B.

With this configuration, when the propeller 21 (22 to 24) is rotated, a large volume of air is smoothly taken through the upper opening 45A having such a large diameter into the dust collection electrode main body 46 and forcibly exhausted through the lower opening 45B.

Since the other configurations, operations, and effects are the same as those in the above-described first and second embodiments, the description thereof will be omitted.

Fourth Embodiment

Next will be described a fourth embodiment of the present invention.

Figure 28:
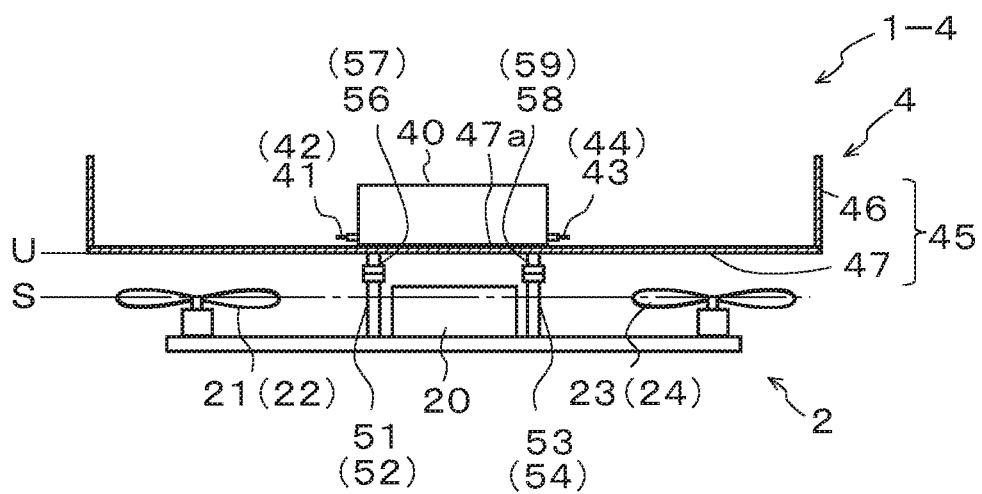
FIG. 28 is a schematic cross-sectional view showing an air cleaner according to a fourth embodiment of the present invention.

FIG. 28 is a schematic cross-sectional view showing an air cleaner according to a fourth embodiment of the present invention.

As shown in FIG. 28, the air cleaner 1-4 of this embodiment is configured such that the dust collection electrode 45 of the dust collector 4 is attached inversely onto the drone 2.

Specifically, with the dust collection electrode 45 exemplified in the above-described embodiments facing upward, the central chamber 40 is arranged within the dust collection electrode 45 and attached onto the central chamber attachment portion 47a of the ribs 47.

The lower end position U of the dust collection electrode 45 is also set at the position of an upper vicinity of the rotational plane S of the propellers 21 to 24 so that air can be taken sufficiently into the dust collection electrode 45 by the propellers 21 to 24.

Since the other configurations, operations, and effects are the same as those in the above-described first to third embodiments, the description thereof will be omitted.

Fifth Embodiment

Next will be described a fifth embodiment of the present invention.

Figure 29:
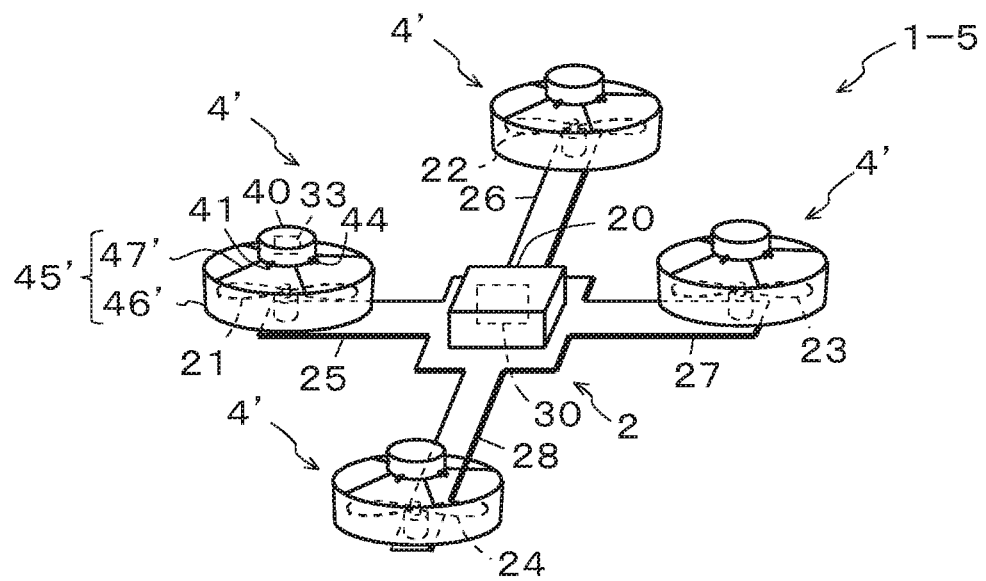
FIG. 29 is a perspective view showing an air cleaner according to a fifth embodiment of the present invention.

FIG. 29 is a perspective view showing an air cleaner according to a fifth embodiment of the present invention.

As shown in FIG. 29, the air cleaner 1-5 of this embodiment is different from the air cleaners 1-1 to 1-4 of the above-described first to fourth embodiments in that small-sized dust collectors 4' are assembled to all of the respective propellers 21 to 24 of the drone 2.

Each dust collector 4' is configured almost similarly to the above-described dust collector 4 and composed of electric discharge electrodes 41 to 44 and a dust collection electrode 45'.

That is, the dust collection electrode 45' is composed of a cylindrical dust collection electrode main body 46' opened upward and downward and a plurality of ribs 47' supporting the dust collection electrode main body 46' and the central chamber 40.

The dust collectors 4' are each assembled over the propeller 21 (22 to 24) using an assembling body not shown and the booster unit 33 in each dust collector 4' is connected through a wiring line not shown to the control unit 30 within the main body unit 20.

Figure 30:
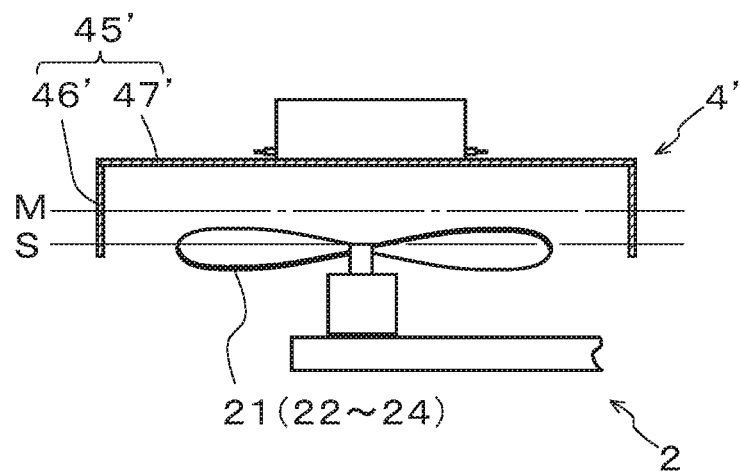
FIG. 30 is a schematic cross-sectional view showing a state where a dust collector is mounted at the lowest position.
Figure 31:
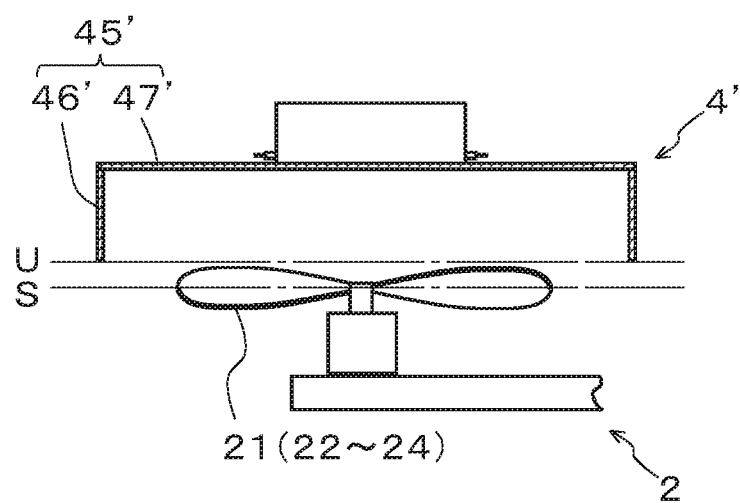
FIG. 31 is a schematic cross-sectional view showing a state where the dust collector is mounted at the highest position.

FIG. 30 is a schematic cross-sectional view showing a state where the dust collector 4' is mounted at the lowest position, while FIG. 31 is a schematic cross-sectional view showing a state where the dust collector 4' is mounted at the highest position.

As shown in FIGS. 30 and 31, as is the case with the dust collector 4 of the above-described embodiments, each dust collector 4' is also assembled over each propeller 21 (22 to 24) such that the central position M of the dust collection electrode 45' is equal to or higher than the position of the rotational plane S of the propeller 21 (22 to 24) and the lower end position U of the dust collection electrode 45' is equal to or lower than the position of an upper vicinity of the rotational plane S of the propeller 21 (22 to 24).

With this configuration, when the drone 2 is in a floating state and the four dust collectors 4' are activated, dust particles in the air that have flowed into each dust collection electrode 45' can be collected by the dust collection electrode main body 46'.

In addition, each dust collector 4' is assembled over each propeller 21 (22 to 24) such that the central position M of the dust collection electrode 45' is equal to or higher than the position of the rotational plane S of the propeller 21 (22 to 24) and the lower end position U of the dust collection electrode 45' is equal to or lower than the position of an upper vicinity of the rotational plane S of the propeller 21 (22 to 24), which provides high dust collecting capability, as is the case with the above-described embodiments.

Since the other configurations, operations, and effects are the same as those in the above-described first to fourth embodiments, the description thereof will be omitted.

Sixth Embodiment

Next will be described a sixth embodiment of the present invention.

Figure 32:
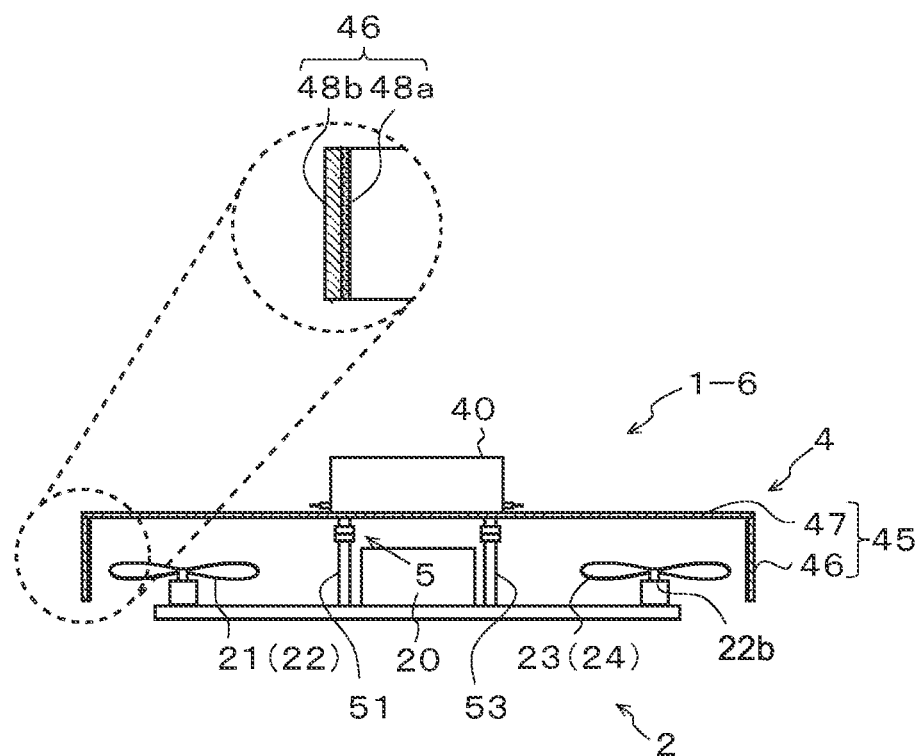
FIG. 32 is a schematic cross-sectional view showing an air cleaner according to a sixth embodiment of the present invention.

FIG. 32 is a schematic cross-sectional view showing an air cleaner according to a sixth embodiment of the present invention.

The air cleaner 1-6 of this embodiment is different from those of the above-described first to fifth embodiments in that the dust collection electrode main body 46 of the dust collector 4 has an aluminum deposited film.

It is generally believed that higher dust collecting effect is demonstrated not only by an electrically conductive member serving as a dust collection electrode but also by arranging, on the surface of the electrically conductive member, a material that is nearly but not completely an insulator and has a moderate volume resistivity.

This embodiment is provided focusing on the points above. Specifically, as shown in FIG. 32, the dust collection electrode main body 46 is configured by forming an aluminum deposited film 48a on the inner surface of a support frame 48b that is formed of PET (polyethylene terephthalate), which has high strength and insulation. The dust collection electrode main body 46 is then assembled to the ribs 47 so that the aluminum deposited film 48a is electrically connected to the electrically conductive ribs 47.

Thus, when a high voltage is applied between the electrically conductive aluminum deposited film 48a and the electric discharge electrodes 41 to 44, dust is collected by the aluminum deposited film 48a and, in addition, an aluminum oxide film generated on the surface of the aluminum deposited film 48a has an effect of further increasing the dust collection rate of the dust collection electrode main body 46, because the aluminum oxide film is nearly but not completely an insulator and has a moderate volume resistivity.

Since the other configurations, operations, and effects are the same as those in the above-described first to fifth embodiments, the description thereof will be omitted.

(Third Variation)

Figure 33:
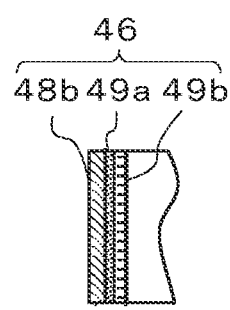
FIG. 33 is a schematic cross-sectional view showing a variation of he sixth embodiment.

FIG. 33 is a schematic cross-sectional view showing a variation of the sixth embodiment.

From the point of view similar to that in which the above-described sixth embodiment is presented, a dust collection electrode main body 46 as shown in FIG. 33 can also be presented, That is, the dust collection electrode main body 46 is configured by providing electrically conductive carbon ink 49a on the inner surface of the support frame 48b and applying a vinyl chloride sheet 49b on the surface of the carbon ink 49a.

Thus, when a high voltage is applied between the electrically conductive carbon ink 49a and the electric discharge electrodes 41 to 44, dust is collected by the carbon ink 49a and, in addition, the vinyl chloride sheet 49b provided on the surface of the carbon ink 49a has an effect of further increasing the dust collection rate of the dust collection electrode main body 46, because the vinyl chloride sheet 49b has a moderate volume resistivity.

It is noted that the present invention is not intended to be limited to the above-described embodiments, but may be variously varied and changed within the spirit and scope of the invention.

For example, in the above-described embodiments, the electric discharge electrodes 41 to 44 are set to be negative, while the dust collection electrode main bodies 46, 46' are set to be positive. However, an air cleaner is also included within the scope of the present invention in which the electric discharge electrodes 41 to 44 are set to be positive, while the dust collection electrode main bodies 46, 46' are set to be negative.

Also, in the above-described embodiments, the electric discharge electrodes 41 to 44 are exemplified that use carbon brushes. However, an air cleaner is also included within the scope of the present invention in which electric discharge electrodes using not a brush-shaped but a needle-shaped or sharp-pointed conductor piece are provided.

Further, in the above-described fifth embodiment, the four propellers 21 to 24 to all of which the respective dust collectors 4' are assembled are exemplified. However, it is only required to dispose a dust collector 4' over at least one or more of the four propellers 21 to 24. An air cleaner is also included within the scope of the present invention in which a dust collector 4' is only assembled over any one of the propellers 21 to 24.

REFERENCE SIGNS LIST 1-1 to 1-6 and 10-1 to 10-4 . . . air cleaner, 2 . . . drone, 4, 4', and 100-1 to 100-10 . . . dust collector, 5 . . . attaching/detaching mechanism, 20 . . . main body unit, 21 to 24 . . . propeller, 21a to 24a . . . motor, 21b to 24b . . . rotary shaft, 25 to 28 . . . frame, 30 . . . control unit, 30a . . . memory, 30b, 30c, and 33b to 33e . . . wiring line, 31 . . . power supply unit, 33 and 103 . . . booster unit, 34 . . . reception unit, 35 . . . antenna, 36 . . . insulated DC/DC converter, 40 . . . central chamber, 40a . . . peripheral surface, 40b . . . lower surface, 40c . . . upper surface, 41 to 44 and 102 . . . electric discharge electrode, 45, 45', and 101 . . . dust collection electrode, 45A . . . upper opening, 45B . . . lower opening, 46 and 46' . . . dust collection electrode main body, 46a and 46b . . . hole, 47 and 47' . . . rib, 47a . . . central chamber attachment portion, 48a . . . aluminum deposited film, 48b . . . support frame, 49a . . . carbon ink, 49b . . . vinyl chloride sheet, 51 to 54 . . . support post, 51a to 54a . . . magnet piece, 56 to 59 . . . placement portion, 56a to 59a . . . magnet piece, 110 . . . chamber, 200 . . . circulator, 201 and 202 . . . honeycomb mesh, 210 . . . ionic number measuring instrument, A . . . air, $A^+$ and $A^-$ . . . air ion, D . . . space, E . . . electric field, M . . . central position, P . . . dust, $P^-$ . . . electrically charged dust, S . . . rotational plane, U . . . lower end position

The invention claimed is:

1. An air cleaner comprising a drone where a plurality of propellers that take in air from above and exhaust air below are disposed around a main body unit having a control unit that controls flying operations, the drone floating by propulsion of the plurality of propellers; and a dust collector having a cylindrical dust collection electrode opened upward and downward and an electric discharge electrode disposed in an approximately central site of the cylindrical dust collection electrode for application of a high voltage between the cylindrical dust collection electrode and the electric discharge electrode such that electric discharge occurs at a tip end portion of the electric discharge electrode to electrically charge and collect dust particles in the air that have flowed into the cylindrical dust collection electrode, wherein the dust collector is assembled to the drone such that the electric discharge electrode is positioned at approximately centered above the drone, and a position where the cylindrical dust collection electrode is arranged in the dust collector is set such that a central position in a height direction of the cylindrical dust collection electrode is equal to or higher than a position of a rotational plane of the plurality of propellers and a lower end position of the cylindrical dust collection electrode is equal to or lower than a position of an upper vicinity of the rotational plane of the plurality of propellers, so that air can be taken into the cylindrical dust collection electrode by rotational forces of the plurality of propellers.

2. An air cleaner comprising a drone where a plurality of propellers that take in air from above and exhaust air below are disposed around a main body unit having a control unit that controls flying operations, the drone floating by propulsion of the plurality of propellers; and a dust collector having a cylindrical dust collection electrode opened upward and downward and an electric discharge electrode disposed in an approximately central site of the cylindrical dust collection electrode for application of a high voltage between the cylindrical dust collection electrode and the electric discharge electrode such that electric discharge occurs at a tip end portion of the electric discharge electrode to electrically charge and collect dust particles in the air that have flowed into the cylindrical dust collection electrode, wherein the dust collector is disposed for in at least one of the plurality of propellers, the dust collector is assembled onto the at least one of the plurality of propellers of the drone such that the electric discharge electrode is positioned at approximately a center above the at least one of the plurality of propellers, and a position where the cylindrical dust collection electrode is arranged in the dust collector is set such that a central position in a height direction of the cylindrical dust collection electrode is equal to or higher than a position of a rotational plane of the at least one of the plurality of propellers, and a lower end position of the cylindrical dust collection electrode is equal to or lower than a position of an upper vicinity of the rotational plane of the at least one of the plurality of propellers, so that air can be taken into the cylindrical dust collection electrode by a rotational force of the at least one of the plurality of propellers.

3. The air cleaner according to claim 1, wherein
the cylindrical dust collection electrode in the dust collector has a plurality of holes for surrounding air to flow therethrough.

4. The air cleaner according to claim 1, wherein
the cylindrical dust collection electrode in the dust collector is set such that an upper opening has a diameter greater than that of a lower opening.

5. The air cleaner according to claim 1, wherein
the dust collector is assembled detachably onto the drone.

6. The air cleaner according to claim 1, wherein
the cylindrical dust collection electrode in the dust collector is set to have a maximum diameter of 10 cm or more and a height of 2.5 cm or more.

7. The air cleaner according to claim 1, wherein
an aluminum deposited film or a vinyl chloride sheet is provided on the inner surface of the cylindrical dust collection electrode in the dust collector.

\* \* \* \* \*